3,582,513
HIGH VISCOSITY POLYVINYL ALCOHOL FROM HIGH-SOLIDS, LOW-VISCOSITY CONDITIONED POLYVINYL ESTER SOLUTIONS

Robert Thomas Bouchard and Paul Joseph Charles Hurtubise, Worcester, Mass., and Jack Dickstein, Huntingdon Valley, Pa., assignors to Borden, Inc., New York, N.Y.
No Drawing. Filed Feb. 9, 1968, Ser. No. 704,243
Int. Cl. C08f 27/16
U.S. Cl. 260—33.4R               8 Claims

---

ABSTRACT OF THE DISCLOSURE

This invention relates to the preparation of polyvinyl alcohols from polyvinyl esters which have been polymerized in suspension in the presence of a conditioning agent selected from the group consisting of the mono- and di-$C_1$-$C_8$ alkyd esters of itaconic and fumaric acid, said conditioning agent being present in an amount sufficient to condition the polyvinyl ester so that high solids, low viscosity solutions thereof can be used to prepare polyvinyl alcohols having a high viscosity in aqueous solution.

---

BACKGROUND OF THE INVENTION

Polyvinyl alcohol is conventionally prepared by the hydrolysis of polyvinyl esters, such as polyvinyl acetate, in a solvent with an appropriate catalyst. In practice, the concentration of polyvinyl ester solids which may be incorporated in the hydrolysis reaction mixture is limited by the solution viscosity which increases with concentration and which must not exceed the critical level of tolerance characteristic of the stirring equipment available. A limiting solids concentration in the range of up to about 25 weight percent is typical of the maximum level ordinarily used in the manufacture of the most common grades of high viscosity (60 cps., 99% hydrolyzed) polyvinyl alcohol. Attempts to further concentrate the solids to a much higher level to increase the throughput rates have not been successful and in fact to obtain even a 25 weight percent level of concentration of the polyvinyl ester it is customary to carry out the polymerization of the vinyl ester to only about 50 to 75% of the theoretical complete polymerization because the products of higher conversion have too high solution viscosities.

U.S. Pats. No. 2,734,048 and No. 3,316,230 show cumbersome attempts to avoid the critical level of tolerance of the stirring equipment by continuously adding polyvinyl acetate beads at low concentration to a hydrolysis reaction mixture and removing the precipitated polyvinyl alcohol as it is formed. The procedures outlined therein require careful control along each step of the process and even then do not result in a satisfactory high viscosity polyvinyl alcohol. In brief, it has not been possible on a commercial basis to produce polyvinyl ester solutions of low viscosity and high solids concentration which can then be hydrolyzed to polyvinyl alcohols having high viscosity in aqueous solution.

SUMMARY OF THE INVENTION

A procedure has now been found by which polyvinyl alcohols having high viscosity in aqueous solution (60 cps. or greater at 4% concentration and 20° C.) can unexpectedly be made from polyvinyl esters having solution viscosities sufficiently low to permit concentrations up to 40% solids or greater in the hydrolysis reaction mixture.

Briefly stated, the present invention comprises the suspension polymerization of a vinyl ester, such as vinyl acetate, in the presence of an effective amount of a conditioning agent selected from the group consisting of the mono- and di-$C_1$-$C_8$ alkyl esters of itaconic and fumaric acid, hydrolysis of the resultant polyvinyl ester in a high solids solution, and drying of the recovered polyvinyl alcohol. The procedure of this invention is applicable over a wide range of polyvinyl acetate bead and polyvinyl alcohol viscosities, always leading to an alcohol of higher viscosity than would normally be expected from the viscosity of the bead. It, therefore, surprisingly offers a new means of controlling the viscosity of the end product as well as permitting higher throughputs at the hydrolysis stage with lower costs for solvent recovery.

DETAILED DESCRIPTION

As to materials, the vinyl ester may be any ester which readily undergoes polymerization and subsequent hydrolysis to polyvinyl alcohol. For purposes of economy, vinyl acetate is preferred but vinyl formate, vinyl propionate and vinyl butyrate, for example, are also suitable.

The conditioning agent is selected from the group consisting of mono- and di-$C_1$-$C_8$ alkyl esters of itaconic and fumaric acid, and mixtures thereof. Specific examples are dimethyl itaconate, dibutyl itaconate, diethyl fumarate, dihexyl fumarate, di-2-ethyl hexyl itaconate, monomethyl fumarate, monoethyl itaconate, and monohexyl itaconate and the like. It is often preferred, however, to use diethyl itaconate since the white color of the polyvinyl alcohol produced from this is commercially advantageous.

The effects characteristic of the instant invention become greater as the proportion of conditioning agent to vinyl ester is increased. Noticeable effects can be detected with as low as 0.1% by weight of conditioning agent based on vinyl ester. In order to maintain the end product as essentially polyvinyl alcohol we prefer not to exceed about 2.5% and we consider 0.5–1% as being optimum.

Polymerization of the vinyl esters may be carried out with any of the conventional initiating systems such as hydrogen peroxide, benzoyl peroxide or lauroyl peroxide. It is preferred, however, to use a combination of isopropyl percarbonate and certain redox couplers, the subject of copending application Ser. No. 704,260 filed on even date herewith.

As a further control of molecular size it is preferred to include in the polymerization reaction mixture a chain transfer agent such as perchloroethylene or acetaldehyde in the range of about .1% to .6% based on vinyl ester. An optimum level of chain transfer agent is considered to be about 0.4%.

"Hydrolysis," as used herein, is intended to designate the replacement of acyl groups of the polyvinyl ester with hydroxyl groups. Hydrolysis to the degree desired, i.e., 60% to 99% for example, may be acocmplished by any known conventional method using either water containing an acidic catalyst or suitable alcoholic solvent containing an alkaline catalyst. Suitable solvents for alkaline hydrolysis include any desired alkanol but it is preferred to use either methanol or mixtures of methanol with 20 to 80% methyl acetate (known in the trade as "Methac"). Mixtures of methanol with up to 40% hexane may also be used. A suitable alkaline catalyst is an alkali-metal hydroxide in amounts between 0.5 and 5 percent based on the weight of polyvinyl ester. The preferred temperature range for hydrolysis is between 20 and 55° C. As noted concentrations of polyvinyl ester up to about 40% can be used. As previous noted, there can be up to 40% or higher polyvinyl ester solids in the hydrolysis solution.

The hydrolyzable solution of polyvinyl ester prepared as noted above results, when the ester is hydrolyzed, in a polyvinyl alcohol having a viscosity ratio to the corresponding ester of from about 0.5 to about 2.

It is not known with certainty by what mechanisms the effects of the instant invention are obtained. However, regardless of the mechanism involved, the product obtained is polyvinyl alcohol which has tensile strength, water resistivity and other properties not significantly different from polyvinyl alcohol of the same viscosity made by conventional methods.

Unless specifically stated to the contrary, all viscosities of polyvinyl acetate referred to herein were measured at 25° C. in a benzene solution containing 86 grams of beads per liter. The viscosities of the polyvinyl alcohols were measured at 20° C. using a 4 percent by weight solution in water.

The invention will be further described in connection with the following examples which are set forth for the purposes of illustration only.

EXAMPLE 1

Water in the quantity of 49.5 parts by weight and 0.124 part of a 10% aqueous solution of polyvinyl alcohol, acting as a suspending agent, were charged to a polymerization vessel equipped with agitator, pot thermometer and reflux condenser. Agitation was started and the air replaced by nitrogen by introducing the nitrogen below the liquid surface. There were added 0.074 part sodium bicarbonate, 0.495 part dibutyl itaconate and 49.504 parts vinyl acetate. Nitrogen purge was continued for 15 minutes. The reaction mixture was heated to 50° C. and entrance of nitrogen purge was changed to "blanket" position, i.e., just above the surface of the liquid. There were then added 0.066 part of 15% naphtha solution of isopropylpercarbonate followed immediately by 0.035 part of sodium hydrosulfite. Ten minutes later 0.198 part of perchloroethylene was added. The reaction mixture was held at 50° C. for 3 hours from the time of addition of the isopropyl percarbonate, following which the temperature was allowed to rise to 55° C. and held there for one hour. Then the temperature of the reaction mixture was raised to 60° C. and held at 60° C. for 1.5 hours. The temperature was finally raised to 95° C. and held at 95° C. for 15 minutes, after which the reaction mixture was cooled to room temperature. The polyvinyl acetate beads were separated from the water phase by centrifugation, washed and dried. The viscosity of a molar benzene solution of the polyvinyl acetate at 25° C. was 37 cps. When the polyvinyl acetate was dissolved in methanol at a concentration adjusted to 17,000 cps., considered close to the tolerable limit of the particular stirring equipment used, the allowable concentration of polyvinyl acetate in the methanol was found to be 40.6% by weight, the composition of the solution being 40.6 parts dry beads, 2.0 parts sodium hydroxide and 57.4 parts methanol. This hydrolysis solution was heated at 40° C., the gel formed was ground, aged, washed, filtered and dried at 100–110° C. for two hours. Analysis showed that 99% of the acetyl groups were replaced by hydroxyl groups. A 4% aqueous solution of the product had a viscosity at 20° C., equal to 60 centipoises.

EXAMPLE 2

The procedure of Example 1 was followed except that the itaconate ester was omitted. The polyvinyl alcohol end product had a viscosity of only 37 cps. In order to obtain a polyvinyl alcohol with a viscosity of 60 cps., in the absence of itaconate, it was necessary to use only half as much perchloroethylene as used in Example 1. However, a molar benzene solution of the polyvinyl acetate beads then had a viscosity at 25° C. of 185 cps., permitting only 24.5% by weight to give the limiting viscosity of 17,000 cps. in the methanol hydrolysis solution, the composition being 24.5 parts beads, 1.2 parts sodium hydroxide and 75.3 parts methanol.

Thus, by polymerizing the vinyl acetate in the presence of dibutyl itaconate, it was possible to obtain the same polyvinyl alcohol as without the itaconate, but with the advantage by increasing the output of polyvinyl alcohol by a factor of 1.65 and with a saving in solvent recovery of about 54%.

EXAMPLE 3

The procedure of Example 1 was carried out, except that the quantity of perchloroethylene used was 0.175 part. The polyvinyl acetate was hydrolyzed at 37% solids and yielded a dried polyvinyl alcohol product of 4% aqueous viscosity 73 cps.—at 20° C.

EXAMPLE 4

The procedure of Example 3 was carried out, except that the dibutyl itaconate was replaced by dimethyl itaconate and the gel was dried at 90–100° C. instead of 100–110° C. The polyvinyl acetate was hydrolyzed at 37% solids and yielded a dried polyvinyl alcohol product having viscosity 92 cps. at 20° C.

EXAMPLE 5

The procedure of Example 3 was carried out, except that di-2-ethyl hexyl itaconate was used in place of dibutyl itaconate. The polyvinyl acetate was hydrolyzed at 37% solids and the dried polyvinyl alcohol product had a viscosity of 55 cps.

EXAMPLE 6

The procedure of Example 1 is carried out with the dibutyl itaconate replaced by, respectively, monoethyl itaconate and di-2-ethyl hexyl itaconate. The resultant polyvinyl acetates are hydrolyzed at concentrations between 30 and 40 weight percent in methanol containing five percent of sodium methylate based on polyvinyl acetate solids. The polyvinyl alcohols obtained after drying at 110° C. for 2 hours have 4% aqueous viscosities in the range of 55 to 62 cps.

EXAMPLE 7

The procedure of Example 1 is carried out except that the methanol used for hydrolysis is replaced by respectively ethyl alcohol and a constant boiling mixture of methanol and methyl acetate, containing about 19% by weight of methanol. The polyvinyl alcohols obtained after drying at 105° C. for 2 hours have 4% aqueous viscosities of about 60 cps.

EXAMPLE 8

The procedure of Example 1 is carried out except that half of the vinyl acetate is replaced by vinyl propionate. The polyvinyl alcohol obtained after drying at 110° C. for 2 hours has a 4% aqueous viscosity equal to about 62 cps.

EXAMPLE 9

Fifty parts by weight of vinyl acetate containing 0.50 part dibutyl itaconate and 0.20 part acetaldehyde were suspended in 50 parts of water with the assistance of 0.124 part of polyvinyl alcohol (10% solution) as a suspending agent, in a reaction vessel equipped with a stirrer, thermometer well, reflux condenser and inlets for sparging and blanketing with nitrogen. The reaction mixture was heated under nitrogen to the point of reflux, 0.040 part of benzoyl peroxide was added and the reaction mixture allowed to reflux for four hours, at which point the vinyl acetate was subtantially completely reacted. The resultant polyvinyl acetate beads were centrifuged, washed and dried. The viscosity of a molar benzene solution of the polyvinyl acetate at 25° C. was 96 cps. The polyvinyl acetate was hydrolyzed at 33% solids, dissolving 33 parts by weight of the dry beads in a mixture of 65.3 parts of methanol with 1.7 parts sodium hydroxide and heating at 50° C. until about 98% of the acetyl groups were replaced by hydroxyl groups. The gel formed was ground, aged, washed, filtered and dried at 100–110° C. for 2 hours. The 4% aqueous solution of the dried product had a viscosity at 20° C. equal to 76 cps. A corresponding product made in the same manner but without the itaconate ester had a viscosity of only 34 cps.

EXAMPLE 10

The procedure of Example 9 was carried out, except that the dibutyl itaconate was replaced by dimethyl itaconate. The viscosity of the polyvinyl alcohol product was 325 cps.

EXAMPLE 11

The procedure of Example 9 was carried out, except that the dibutyl itaconate was replaced by di-2-ethyl itaconate. The viscosity of the polyvinyl alcohol product was 62 cps.

EXAMPLE 12

The procedure of Example 1 was carried out except that 0.5% of diethyl fumarate, based on the weight of vinyl acetate, was substituted for the dibutyl itaconate. The viscosity of the resultant polyvinyl acetate was 95 cps. and the polyvinyl alcohol formed upon hydrolysis had a viscosity of 52 cps.

EXAMPLE 13

The procedure of Example 12 was carried out except that 1% of diethyl fumarate was used. The viscosity of the polyvinyl acetate was 100 cps. and that of the polyvinyl alcohol was 160 cps.

EXAMPLE 14

A series of polymerizations and hydrolyses is carried out using the procedure of Example 1, except that monomethyl fumarate, monohexyl itaconate, dihexyl fumarate, monomethyl itaconate, and monobutyl itaconate, are substituted for the dibutyl itaconate. In each case high viscosity polyvinyl alcohols are obtained.

It will be understood that it is intended to cover all changes and modifications of the examples of the invention herein chosen for the purpose of illustration which do not constitute departures from the spirit and scope of the invention.

What is claimed is:

1. A high solids polyvinyl ester solution comprising at least about 30 parts by weight, for each 100 parts by weight of solution, of a polyvinyl ester selected from the group consisting of polyvinyl formate, polyvinyl acetate, polyvinyl propionate, and polyvinyl butyrate, the polyvinyl ester being made by polymerizing the corresponding vinyl ester in the presence of from about 0.1% to about 2.5% by weight, based on the weight of vinyl ester, of a conditioning agent selected from the group consisting of di-$C_1$-$C_8$ alkyl esters of itaconic and fumaric acid, and mixtures thereof, and as a major component of the solution, a solvent for the polyvinyl ester.

2. The solution of claim 1, wherein the polyvinyl ester is polyvinyl acetate.

3. The solution of claim 1, wherein the solvent is methanol.

4. A method of making polyvinyl alcohol of a viscosity grade of at least about 60 cps. which comprises (a) suspension polymerizing a vinyl ester selected from the group consisting of vinyl formate, vinyl acetate, vinyl propionate and vinyl butyrate in the presence of from about 0.1 to about 2.5% by weight based on the weight of vinyl ester, of a conditioning agent selected from the group consisting of mono- and di-$C_1$-$C_8$ alkyl esters of itaconic and fumaric acid and mixtures thereof, (b) making a solution of the resultant polyvinyl ester comprising at least about 30 parts by weight for each 100 parts by weight of solution, (c) hydrolyzing said polyvinyl ester in said solution to at least about 60%, the viscosity ratio of said resultant polyvinyl alcohol to the corresponding ester being between about 0.5 and about 2.0, and (d) drying the resultant polyvinyl alcohol.

5. The method of claim 4 wherein the vinyl ester is vinyl acetate and the conditioning agent is dimethyl itaconate.

6. The method of claim 4 wherein the vinyl ester is vinyl acetate and the conditioning agent is dibutyl itaconate.

7. The method of claim 4 wherein the vinyl ester is vinyl acetate and the conditioning agent is diethyl fumarate.

8. The process in claim 4 wherein the drying is conducted at a temperature range of between 90° C. and 110° C.

References Cited

UNITED STATES PATENTS

| 2,637,712 | 5/1953 | Upton | 260—29.6 |
| 2,643,994 | 6/1953 | Germain | 260—91.3 |
| 3,409,598 | 11/1968 | Takigawa et al. | 260—78.5 |

JOSEPH L. SCHOFER, Primary Examiner

S. M. LEVIN, Assistant Examiner

U.S. Cl. X.R.

260—78.5E, 78.5R, 89.1, 91.3PVP